United States Patent [19]

Tallman

[11] 3,897,044

[45] July 29, 1975

[54] CAMPER JACK

[76] Inventor: Erven Tallman, 15934 S. Figueroa St., Gardena, Calif. 92643

[22] Filed: May 15, 1974

[21] Appl. No.: 470,129

[52] U.S. Cl. ................. 254/45; 403/108; 254/86 H
[51] Int. Cl. ............................ B66f 7/26; B60s 9/02
[58] Field of Search .................. 254/86 R, 86 H, 45; 248/354 R, 354 P, 408, 409; 403/108, 327; 24/213 C, 215; 280/150.5; 214/515

[56] References Cited
UNITED STATES PATENTS

| 2,594,605 | 4/1952 | Zoppelt | 248/354 P |
| 2,653,785 | 9/1953 | La Russa | 248/354 P |
| 3,689,029 | 9/1972 | Bargman | 254/45 |

FOREIGN PATENTS OR APPLICATIONS

| 211,671 | 3/1957 | Australia | 403/108 |

Primary Examiner—Othell M. Simpson

[57] ABSTRACT

A jack for vehicles known widely as campers has two tubes in telescoping relationship with each other and a hydraulic hand-actuated pump serves to move one of the tubes outwardly of the other when operated. When the tube is moved into retracted position, it is securely held in that position by a releasable detent button on the inner tube which extends into a cylindrical walled hole in the outer tube. The button is riveted midway between opposite ends of a wide arcuate clock-type spring which is nested within the inner wall of the inner tube.

5 Claims, 5 Drawing Figures

PATENTED JUL 29 1975
3,897,044
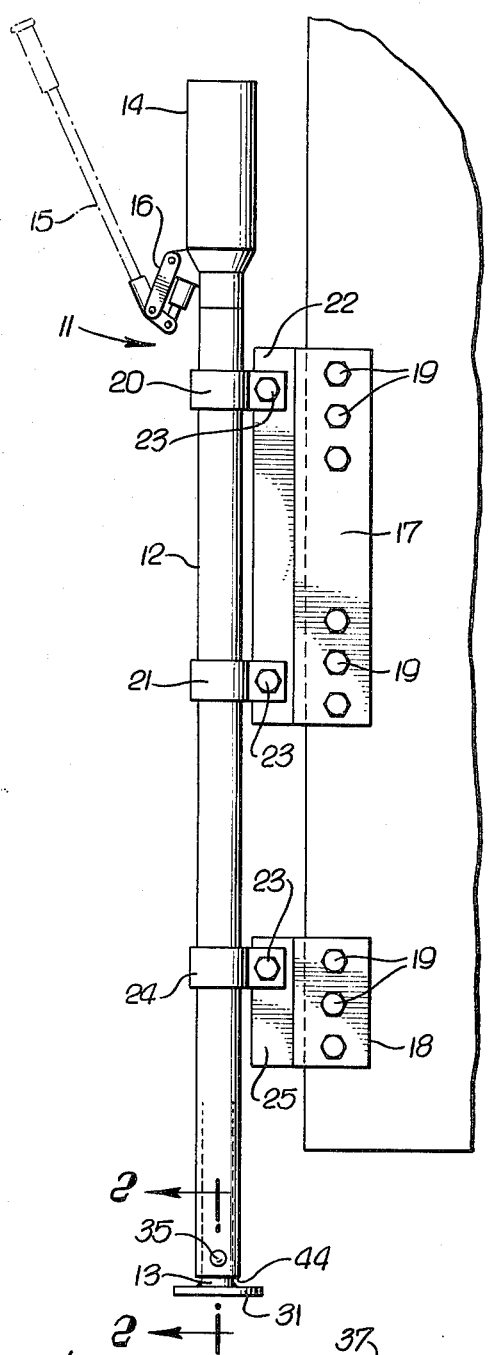
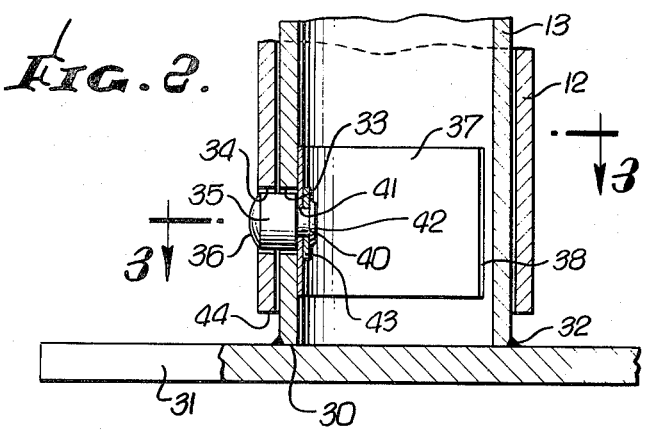
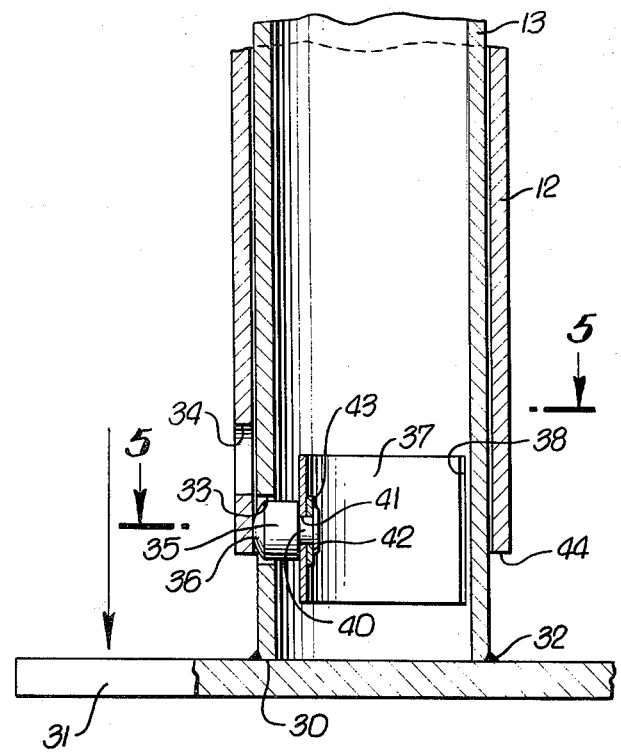
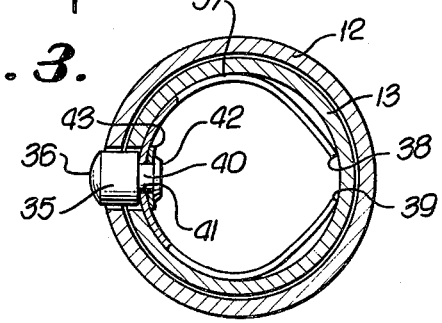
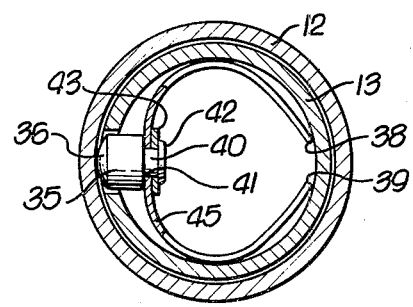

CAMPER JACK

When hydraulic jacks are permanently anchored on vehicles such as campers which are transported on pickup trucks, they need to be of such character that they are always in place and ready for manipulation with the least waste of time. This accounts partly for their being permanently installed in verticle position at precisely the location where they should be in order to have the jack lowered to the ground surface and then used to lift the camper vehicle high enough above the pickup truck to permit the pickup truck to be driven from underneath the camper. Following removal of the pickup truck, the camper jacks are then manipulated to lower the camper vehicle to a position close to ground surface. Conversely when the camper is to be remounted on the truck, it is first lifted to its previous high position above the point of rest on the pickup truck, the pickup truck is driven under the camper, and then the jacks again lowered a short distance sufficient to rest the camper at the location provided for it on the pickup truck.

The hydraulic jacks made use of are long tubular jacks which have one outer telescoping tubular rod attached to the body of the camper vehicle and another long tubular rod inside which can be extended 4 or 5 feet on the average to contact with the ground surface. Since a great variety of ground surfaces are encountered regularly, a ground contacting pad, plate or foot piece of some kind becomes advisable in order to spread the load at least to a degree.

For different kinds of surfaces, different types of pads may be found advisable. As a consequence, it is highly desirable to have such pads removable with respect to the jack but at the same time, since they are to be carried in readiness for use, they should be securely attached to the jack when the vehicle is travelling.

Heretofore, one of the more common expedients has been to make use of a pin capable of being inserted into matching holes whereby to pin the foot piece in place when needed and, conversely, capable of being withdrawn when such foot piece is to be either removed for replacement or carried aboard the vehicle. As is so often the case loose pins, or even pins tied fast, are apt to become lost or misplaced and one or more missing foot pieces may amount to an appreciable inconvenience. Even though push buttons have been considered as an expedient the mere presence of a push button is not necessarily a solution to the problem because due to the requirements of ruggedness and dependability as well as to the loading required to be put upon such a push button, if the push button is deformed it will not work properly and, in the course of time, the foot piece and the attached tubular structure may become lost and have to be replaced at considerable expense and inconvenience.

It is therefore among the objects of the invention to provide a new and improved camper jack of the type making use of telescoping tubular rods wherein the rod which is extended under hydraulic power is provided with a dependable detent button which is sufficiently rugged to sustain a full loading of a vehicle such as a camper but which is one capable of being readily depressed by hand when the tubular rod is to be released.

Another object of the invention is to provide a new and improved camper jack which makes use of an inside tubular rod equipped with a foot piece wherein the rod and foot piece are removably mounted in an outer tubular rod and wherein a button assembly for holding two rods in engagement both during transportation of the vehicle and when the vehicle is at rest on the ground surface, is firmly anchored in place at all times in operable position and which, at the same time, is of such design and construction that one rod cannot inadvertently be moved with respect to the other rod unless the button is expressly released by hand.

Still another object of the invention is to provide a new and improved camper jack making use of outer and inner telescoping tubular rods wherein the tubular rod which is provided with a ground engaging foot or shoe is provided with a releasable detent of simple positive rugged character but which, at the same time, is simple in its design and relatively inexpensive to manufacture and install.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 is a side elevational view of one of the camper jacks shown in a position attached to a camper vehicle.

FIG. 2 is a fragmentary longitudinal sectional view on the line 2—2 of FIG. 1.

FIG. 3 is a cross sectional view on the line 3—3 of FIG. 2.

FIG. 4 is a fragmentary longitudinal view of the tubular rods when the jack is being shifted from one position to another.

FIG. 5 is a cross sectional view on the line 5—5 of FIG. 4.

In an embodiment of the invention chosen for the purpose of illustration, there is shown a fragment of vehicle 10 which normally comprises a camper body of the type adapted to be removably mounted upon a pickup truck.

A jack indicated by the reference character 11 consists of an outer tubular rod 12, an inner tubular rod 13 and a hydraulic ram 14. The hydraulic ram is provided with the customary handle 15 and linkage 16 for manipulation.

To mount the jack 11 on the vehicle 10, a large T-bracket 17 is made use of at an upper location and a smaller T-bracket 18 is made use of at a lower location. The T-bracket 17 is attached to the vehicle 10 by means of lag screws 19. Similar lag screws 19 are used to attach the T-bracket 18. Upper and lower straps 20 and 21 surrounding the outer tubular rod 12 are attached to a flange 22 of the T-bracket 17 by means of bolts 23. Another strap 24 surrounding the outer tubular rod 12 at a lower location is attached to a flange 25 of the T-bracket 18 by use of similar bolts 23.

Attached to the bottom edge 30 of the inner tubular rod 13 is a pad or foot plate 31 which extends transversely relative to the rod for an appreciable distance outwardly. Attachment may be by a weldment 32 or other appropriate means. Adjacent the lowermost edge of the inner tubular rod but spaced therefrom is provided a cylindrical walled hole 33 which is adapted in certain positions of adjustment to be in alignment with a similar cylindrical walled hole 34 in the outer tubular rod 12.

A cylindrical button 35 having a shallow rounded outer end 36 is anchored to a wide-band clock spring 37 at a location substantially midway between opposite ends 38 and 39. As shown by way of example, a portion 40 of the bottom 35, of reduced diameter, extends through a hole 41 in the clock spring 37, the button having a riveted over portion 42 bearing on a washer 43 to firmly anchor the button 35 to the clock spring.

When the inner tubular rod is in its uppermost or withdrawn position, as shown in FIGS. 1 and 2, which is the position occupied while the vehicle is being transported from place to place, the button 35 is extended by spring force outwardly into the cylindrical walled hole 34 of the outer tubular rod. When the inner tubular rod is to be lowered, the button is depressed a distance sufficient to disengage it from the outer tubular rod, and the inner tubular rod is then free to be lowered until the foot plate 31 comes into engagement with the ground.

The hydraulic ram 14 is then manipulated in order to lift the vehicle 6 inches or so above its position on the pickup truck. In actual practice there are customarily four such jacks at four corners of the vehicle which are moved one at a time the necessary few inches. Following this operation and after the pickup truck has been moved away, the vehicle is lowered slowly by manipulation of the hydraulic ram at each of the four corners until the outer tubular rod 12 has moved down to a location where a lowermost edge 44 of the outer tubular rod 12 is close to the button 35. The button is then depressed sufficient to clear the inner wall of the outer tubular rod and the outer tubular rod then lowered a sufficient distance further to have the cylindrical walled holes 33 and 34 align with each other, whereupon tension stored in the spring 37 extends the button outwardly into the hole 34 whereupon the weight of the vehicle 10 becomes supported on the button through the rods.

By providing a very wide band clock spring 37 appreciable stability is built into the button assembly consisting as it does of the button anchored to the spring. Having the ends 38 and 39 of the clock spring spaced slightly from each other and bearing against the inside wall of the rod provides a firm spring engagement and also one which encourages a bow 45 in the spring. When the button is depressed the spring while being yieldable when pressed firmly by hand is also such as to store adequate energy to extend entirely the button outwardly when it is to engage both of the holes 33 and 34.

With the device constructed as described, the inner and outer rods are firmly attached to each other when the button is extended and cannot be moved irrespective of the amount of pressure which may be applied in a direction tending to shift one rod with respect to the other.

While the invention has herein been shown and described in what is conceived to be a practical and effective embodiment it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A jack for attachment to a vehicle and adapted to be carried thereby at a location in readiness for lowering to extended position, said jack comprising an inner hollow tubular rod and an outer hollow tubular rod in telescoping relationship, a free end of the outer of said tubular rods having a cylindrical walled hole in the wall of the tubular rod at a location spaced from and adjacent a free end of said outer tubular rod, the inner of said tubular rods having a cylindrical walled hole at a location spaced from and adjacent a free end thereof of substantially the same size as said first identified cylindrical walled hole, and a button having a diameter providing a free sliding fit of said button in said holes, the button having a length about equal to the aggregate depth of said two holes, and spring means biased in a direction adapted to extend the button into said holes when the holes are in alignment in retracted position of the inner of said tubular rods, and spring means comprising a flat spring member having a convex outer face parallel to the longitudinal axis of said inner tubular rod and having a width greater than the diameter of said button and an arcuate length slightly less than the inside circumference of said inner tubular rod, said button having an inward extension thereon anchored to the flat spring intermediate its ends, portions of said spring member on opposite sides of said button being substantially equal in length and extending for substantially equal distances around the inside wall of said inner tubular rod.

2. A camper jack as defined in claim 1 wherein there is a transverse foot plate at the free end of the inner of said tubular rods.

3. A camper jack as defined in claim 1 wherein the width of the flat spring member is substantially three times the diameter of the button and portions of said convex outer face lie in tangential contact with the inside wall of said inner tubular rod.

4. A camper jack as defined in claim 3 wherein the button is anchored to the spring substantially midway between the ends and the ends are adjacent and spaced from each other on the opposite side of the inner of said tubular rods, said ends being parallel to each other and in engagement with the inside wall of said inner tubular rod.

5. A camper jack as defined in claim 1 wherein the outer of said tubular rods is anchored in vertical position to the vehicle and the free ends of said tubular rods when in retracted position are adjacent the lowermost portion of the vehicle.

* * * * *